March 3, 1936.  I. J. LARSON  2,032,422
MECHANISM FOR PRODUCING INTERMITTENT MOTION
Filed Jan. 27, 1934
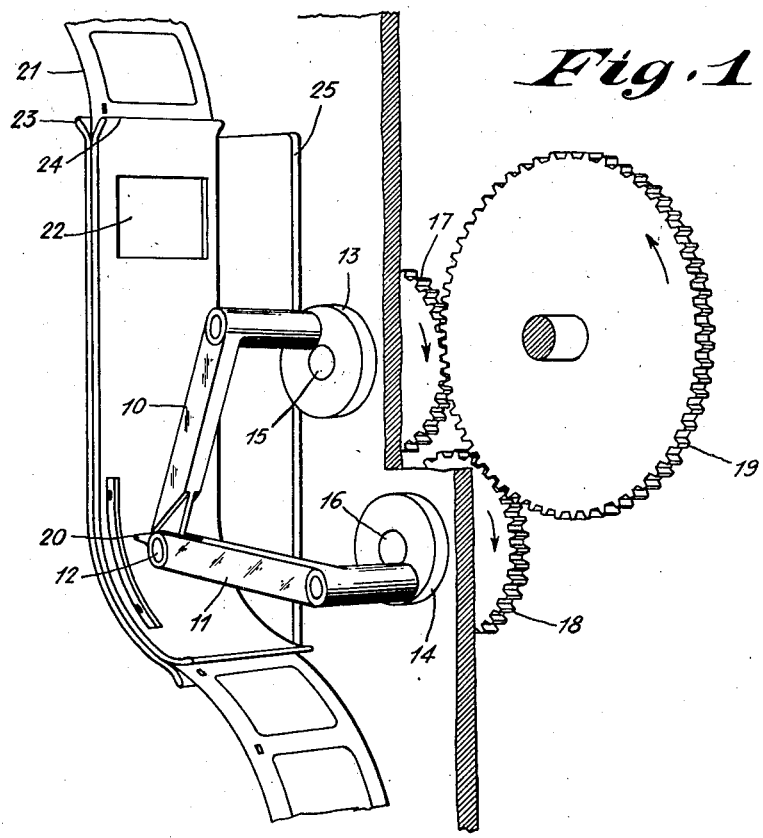
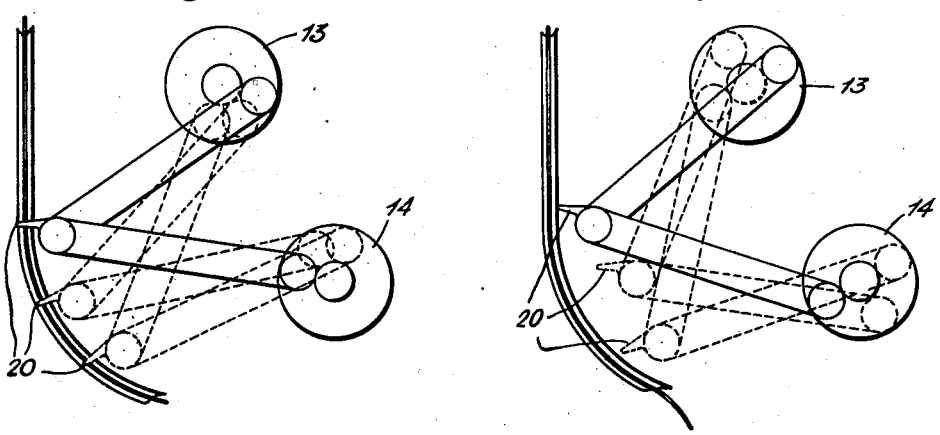
INVENTOR:
INER J. LARSON
by H. B. Grover
ATTORNEY Patented Mar. 3, 1936

2,032,422

UNITED STATES PATENT OFFICE 2,032,422

MECHANISM FOR PRODUCING INTERMITTENT MOTION

Iner J. Larson, Oaklyn, N. J., assignor to Radio Corporation of America, a corporation of Delaware Application January 27, 1934, Serial No. 708,546

5 Claims. (Cl. 88—18.4)

This invention relates to mechanisms for producing intermittent motion, and has for its principal object the provision of an improved intermittent motion mechanism which is simply and ruggedly constructed of comparatively few parts and operates with a movement which is smooth and substantially continuous along a predetermined path.

Many of the mechanisms heretofore provided for imparting intermittent motion to a motion picture film, or the like, have not been altogether satisfactory for the reason that their operation involves abrupt changes in the movement of their various parts and produces excessive wear and objectionable vibrations. In accordance with the present invention, these difficulties are minized or avoided by the provision of a mechanism including a pair of hinged arms arranged to be rotated at their free ends in a manner to cause a contact member mounted at their junction to move along a predetermined path including for a fraction of length the path of the film or other member to be intermittently moved.

The invention will be better understood from the following description when considered in connection with the accompanying drawing and its scope will be pointed out in the appended claims.

Referring to the drawing:

Fig. 1 is a perspective view of the improved mechanism, and

Figs. 2 and 3 are explanatory diagrams relating to its operation.

The device of Fig. 1 includes a pair of arms or levers 10 and 11 hinged or pivoted together at the point 12 and attached at the opposite ends to pulleys 13 and 14. These pulleys are mounted on shafts 15 and 16 and are driven through a gear train including a gear 17 mounted on the shaft 15, a gear 18 mounted on the shaft 16 and a main drive gear 19 which meshes with the gears 17 and 18 and may be supplied with driving torque from any suitable source. Through this drive system eccentric motion is imparted to the free ends of the levers.

It will be apparent from the drawing that the elements 13 and 14 are substantially identical as to size and also as to direction and speed of rotation. It will also be apparent that the arms or levers 10 and 11 are of substantially the same length and are pivoted together at their extreme ends. The elements 13 and 14 need not be cranked pulleys, as shown, but may be any mechanical equivalent thereof, such as cranks or eccentrics.

It will be noted that a contact member such as a claw 20 attached to or forming a part of the lever 11 is arranged to engage the perforations of a film 21 in its downward course past a motion picture aperture 22 and through a film gate including the members 23 and 24 mounted on a support 25.

At its lower end, this gate is curved for the purpose of bringing the film into the path of the contact member 20.

As indicated in Figs. 2 and 3, this contact member is maintained in contact with the film only for one-third of the time required for the member 20 to complete its cycle of movement. Thus the member 20 is engaged with the film in the three positions indicated by Fig. 2 and is disengaged from the film in the three positions illustrated by Fig. 3. Due to the continuous rotary movement of its moving parts, the mechanism functions smoothly and without excessive wear of its bearing surfaces.

Having thus described my invention, I claim:

1. The combination of film path defining means, a pair of members similar in length hinged together at one of their extreme ends and provided with a projecting member, and rotatable crank means of similar throw and direction of rotation attached to the other ends of said members for causing said projecting member to follow a cycle of movement including said path.

2. The combination of film path defining means, a pair of members similar in length hinged together at one of their extreme ends and provided with a projecting member, and separate rotatable crank means of similar throw and direction of rotation attached to the other ends of said members for causing said projecting member to follow a cycle of movement including said path.

3. The combination of film path defining means, a pair of members similar in length hinged together at one of their extreme ends and provided with a projecting member, rotatable crank means of similar throw and direction of rotation attached to the other ends of said members for causing said projecting member to follow a cycle of movement including said path, and a common means for similarly actuating said rotatable means.

4. The combination of film path defining means, a pair of members of similar length hinged together at one of their extreme ends and provided with a projecting member, and means for imparting eccentric movements of similar radius and direction to the other ends of said members whereby said projecting member is constrained to a cycle of movement including said path.

5. An intermittent feed mechanism comprising two eccentrics of similar throw, means driving said eccentrics at the same speed and in the same direction, a pair of members of substantially the same length hinged together at one of their ends and having their other ends connected to the said eccentrics, means on said hinged end for engaging a film, and means for guiding a film through a portion of the path of said film-engaging means.

INER J. LARSON.